G. M. PRATT,

Assignor to the VICTOR SEWING MACHINE Co.

Chuck for Metal-Drills.

No. 8,793. Reissued July 8, 1879.

Attest:
H. L. Perine
A. H. Norris

Geo M. Pratt.
Inventor.

By. James L. Norris.
Atty.

N. PETERS, PHOTO-LITHOGRAPHER, WASHINGTON, D. C.

UNITED STATES PATENT OFFICE.

GEORGE M. PRATT, OF MIDDLETOWN, CONNECTICUT, ASSIGNOR TO THE VICTOR SEWING MACHINE COMPANY.

IMPROVEMENT IN CHUCKS FOR METAL DRILLS.

Specification forming part of Letters Patent No. 164,032, dated June 1, 1875; Reissue No. 8,793, dated July 8, 1879; application filed July 12, 1877.

*To all whom it may concern:*

Be it known that I, GEORGE M. PRATT, of Middletown, in the county of Middlesex and State of Connecticut, have invented certain new and useful Improvements in Drill-Chucks, of which the following is a specification.

This invention relates to certain improvement in that class of self-centering drill-chucks in which the drill or tool is grasped and held by means of sliding jaws adapted to move to and from a common center in a suitable carrier, being actuated by means of the chuck-head.

My invention consists in an improved device for operating the levers by means of which the clutches are actuated, consisting of a cylindrical follower, swiveled to the clutch-head, and working in the hollow part of the clutch-holder behind the levers, said follower being provided with three longitudinal recesses with inclined bottoms, in which the ends of the levers fit, and by which they are actuated, as will be more fully hereinafter described.

Figure 1:
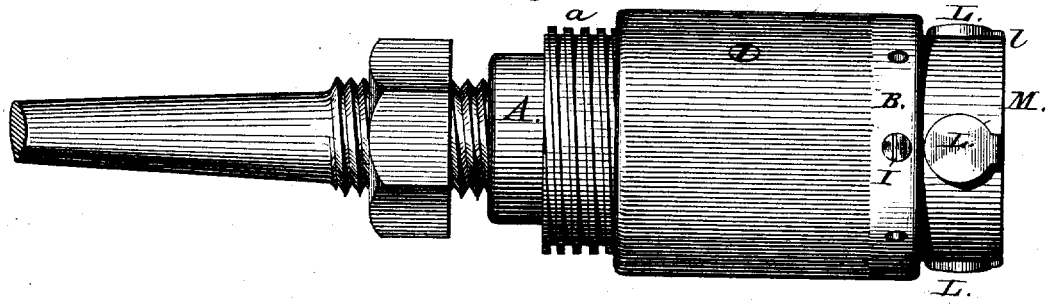
Figure 2:
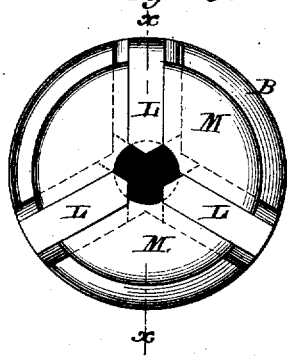
Figure 3:
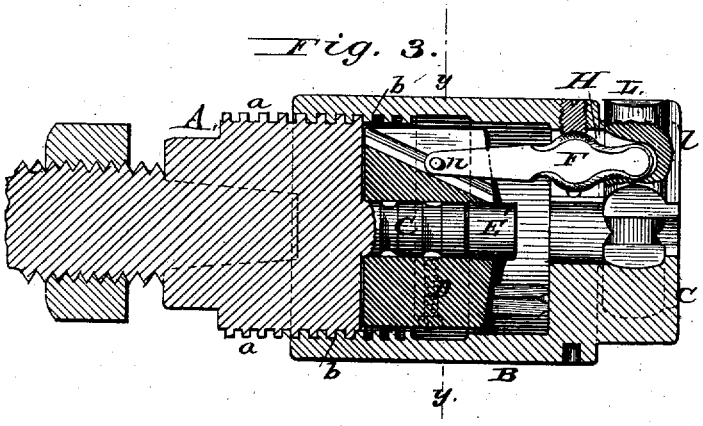
Figure 4:
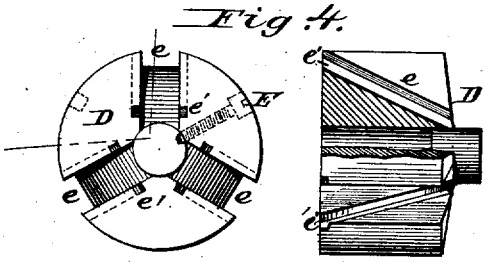
Figure 5:
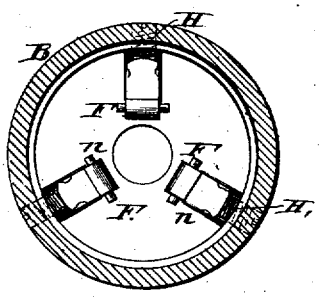
Figure 5:
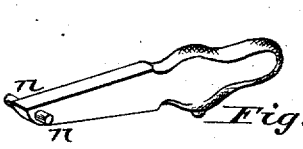

In the drawings, Figure 1 represents a side view of my improved chuck. Fig. 2 is a front view of the same. Fig. 3 is a longitudinal central section; Fig. 4, detached views of the follower. Fig. 5 is a diametric section taken in the rear of the levers, and Fig. 6 detached views of one of the levers and sliding clutches.

The letter A represents the chuck-head, provided with a shank or spindle, by which it may be secured to the mandrel of the lathe, and having a male screw, *a*, formed upon its periphery, which gears into a female screw, *b*, formed in the interior of the chuck-holder B, as shown in Figs. 1 and 3.

To the front of the head A is attached a spindle, C, carrying a cylindrical follower, D, which is held thereon by means of a screw, E, the inner rounded end of which sets into one of the grooves in the spindle. This follower is provided with three longitudinal slots, *e e e*, the bottoms of which are inclined from the periphery of said follower at the rear to the center, in front of the same, forming a conical bearing-surface for operating the levers, and dispensing with the connecting-links usually employed for the purpose.

F F F represent the levers which actuate the clutches L L L. Said levers pass through slots H H H in the forward end of the holder B. Said levers are enlarged and rounded at their fulcrums, forming spherical bearings for the same, which rest against the concave tops of the screws I I I, passing through the walls of the holder B. The enlarged portions of the levers F are fulcrumed between the said adjusting-screws and the rigid bottom walls of the slots H, which form rigid fulcrums for said levers, and prevent any yielding in either direction when the screws are set to properly bear against the levers.

By means of the adjusting-screws provision is made to adjust for the wear of the levers, their operating devices, or the clutches, so that the clutches may always be made to travel properly with respect to each other relatively, in order that the tool may be properly centered between them.

Figure 6:
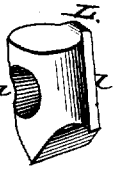

The sliding clutches L L L, each consisting of a short cylinder of metal, provided with a broad longitudinal feather, *l*, are double beveled on their lower edges, as shown in Fig. 6. These clutches are adapted to fit in a series of radial cylindrical chambers, M M M, near the front or face of the holder B, said holder being slotted in front of the cylinders to receive the feathers on the clutches, which come flush with the face or front of the chuck. The front end of the levers fit into recesses *m* of the clutches, the rear ends being provided with laterally-projecting pins *n* to return the clutches or throw them out when the rear ends of the levers are moved inward by the rearward movement of the followers. To effect this the recesses in the follower are grooved on each side wall on a line parallel with the inclined bottom, as shown at *e'*, Fig. 4. The pins on the ends of the levers, being set into these grooves, will throw the levers back upon the return motion of the follower.

The follower may, if desired, be provided with a longitudinal groove upon its periphery, into which the end of a retaining-screw, passing through the wall of the holder, may project to prevent the follower from turning with the chuck-head, and prevent the holder B from being screwed off from the chuck-head when opened full size.

The operation of my improved chuck is as follows: The parts being in position, as shown in Fig. 1, a drill of any convenient size is inserted between the inner pointed ends of the clutches. The chuck-head is then turned so as to advance the follower, when the inclined bottoms of the recesses will force the rear ends of the levers apart, pressing the clutches together in the radial chambers toward their common center, causing the same to grasp and hold the tool. When the tool is to be released the operation is reversed, when the pins and the grooves in the follower will act upon the levers, bringing them back to their original positions, and throwing the clutches away from the tool.

Having thus described my invention, what I claim as new, and desire to secure by Letters Patent, is—

1. In combination with the chuck-head and levers, the cylindrical follower with longitudinal recesses, having inclined bottoms for the purpose of operating said levers without straining the same, substantially as set forth.

2. In combination with the cylindrical follower, having longitudinal recesses, and the levers for actuating the clutches, the inclined grooves in the side walls of said recesses for returning the levers and clutches, as and for the purposes set forth.

3. The combination, with the casing, the sliding jaws, and the follower, of the levers F, having the enlarged fulcrum portions, and the screws I, passing through the casing and bearing upon said fulcrum portions, substantially as described, and for the purpose set forth.

In testimony whereof I have hereunto set my hand in the presence of two witnesses.

GEO. M. PRATT.

Witnesses:

S. P. HULL,

W. L. BLAKE.